United States Patent [19]

Hanaway

[11] Patent Number: 5,316,390
[45] Date of Patent: May 31, 1994

[54] GUIDE SLEEVE WITH SEAL, GUIDE POST AND BALL BEARING ASSEMBLY

[76] Inventor: Ronald L. Hanaway, 30210 E. Eight Mile Rd., Farmington Hills, Mich. 48236

[21] Appl. No.: 999,426

[22] Filed: Dec. 31, 1992

[51] Int. Cl.⁵ .................... F16C 29/04; F16J 15/56
[52] U.S. Cl. .................................. 384/49; 277/24; 384/30
[58] Field of Search ................ 384/49, 13, 16, 30; 277/152, 24, 170, 168, 50, 165, 117, 115

[56] References Cited

U.S. PATENT DOCUMENTS

| | | | |
|---|---|---|---|
| 2,422,774 | 6/1947 | Conner | 384/30 |
| 2,981,569 | 4/1961 | Danly | 384/30 |
| 3,224,817 | 12/1965 | Miller et al. | 384/16 |
| 3,434,760 | 3/1969 | Wendler | 384/30 |
| 3,866,923 | 2/1975 | Gorman | 277/24 |
| 3,992,122 | 11/1976 | Maxey | 384/49 X |
| 4,168,837 | 9/1979 | Benjamin et al. | 277/24 |

Primary Examiner—Thomas R. Hannon
Attorney, Agent, or Firm—Dykema Gossett

[57] ABSTRACT

A guide post, guide sleeve, and ball bearing assembly especially for a die set has a leak proof seal contained within one end of the guide sleeve for slidably sealing the interface between the guide post and guide sleeve and slidingly cleaning the surface of the guide post during relative reciprocal movements of the guide post and guide sleeve. The assembly maintains optimal lubrication of the ball bearing assembly while providing a cleaner, more frictionless configuration.

18 Claims, 1 Drawing Sheet

GUIDE SLEEVE WITH SEAL, GUIDE POST AND BALL BEARING ASSEMBLY

FIELD OF THE INVENTION

The present invention generally relates to a die set with a guide sleeve having a seal, guide post and ball bearing assembly for maintaining the opposite die shoes of the die set in alignment during relative reciprocal movements.

BACKGROUND OF THE INVENTION

Bearing assemblies are well known. An example of a ball bearing assembly is disclosed in U.S. Pat. No. 4,664,534 dated May 12, 1987, and issued to the present inventor. The ball bearings within the ball bearing assembly must be lubricated to reduce the friction within the system to a minimum. The open ended guide sleeve of the U.S. Pat. No. 4,664,534 bearing assembly limits how and where the lubrication can be maintained in the system. Typically, the guide sleeve was maintained in a lower die shoe with a seal at the bottom thereby providing a reservoir for lubricating fluid, such as oil, to lubricate the ball bearings. In such a configuration, there were limitations on the amount of lubrication provided to the ball bearing cage. In the typical configuration, the lubricating fluid reservoir was only at the bottom of the guide sleeve. Therefore, the top portion of the ball bearing cage, which engages the guide post more often than the lower portion, did not receive optimal lubrication throughout its stroke.

Further, the open ended guide sleeve reservoir requires a spatial orientation including horizontal die shoes with the guide sleeve set vertically within the lower shoe. Any other orientation would result in the lubricating fluid leaking out of the reservoir, defeating the intended purpose and potentially interfering with the die casting, stamping or injection molding. Additionally, any debris or dirt in the system potentially could collect on the ball bearing assembly or the guide post thereby causing additional friction and wear leading to untimely loss of precision of the tooling and accuracy in the manufactured component.

Previously with guide post, guide sleeve and ball bearing assemblies there was not known any means for positively assuring an adequate lubrication of the ball bearing cage and maintaining a relatively dirt free environment for the ball bearings to act upon the guide post within the guide sleeve.

SUMMARY OF THE INVENTION

An important feature of the present invention is to provide adequate lubrication to the ball bearing cage assembly. The present invention maintains a superior lubricating system for the ball bearing assembly by having a sealing member fixedly attached to one end of the guide sleeve. The sealing member provides a means for maintaining a lubricating fluid reservoir within the entire guide sleeve that receives the entire ball bearing cage assembly inside an internal bore. The sealing member is placed between the interface between the guide sleeve and guide post providing a leak proof barrier to maintain lubricating fluid inside the guide sleeve. In this manner, the lubricating fluid is available to constantly lubricate the entire ball bearing cage.

An additional advantage of the inventive guide sleeve seal is that it effectively removes limits on the guide sleeve's spatial orientation relative to the die set. For example, previously guide sleeves had to be placed vertically within a lower horizontal die shoe so that any lubricating fluid maintained in a reservoir at the bottom of the guide sleeve would not leak out during a typical die casting operation. With the inventive sealing member attached to a guide sleeve, it is possible to maintain a guide sleeve on an upper horizontal die shoe or a vertical die shoe or one oriented at any angle. In this manner, greater versatility is available for configuring die sets allowing full lubrication of the ball bearing cage without allowing any of the lubricating fluid to leak into the system outside of the guide sleeve. Moreover, affixing the guide sleeve to an upper die shoe concentrates the lubricating fluid where it is needed most; at the points where the ball bearing assembly engages the guide post throughout its die casting operation.

A further advantage of the present invention is that it provides a means for cleaning the guide post during a die casting, metal stamping or injection molding operation. The sealing member travels longitudinally along the surface of the guide post during the die shoe reciprocal movements effectively cleaning the guide post. The seal provides a sweeping, cleaning action as it slides along the guide post. In this manner, any debris or dirt that collects on the guide post during a die casting operation is pushed away by the sealing member preventing it from entering the guide sleeve, collecting on the ball bearings or contaminating the lubricating fluid. Therefore, the inventive guide sleeve seal provides a means for maintaining cleaner lubrication of the ball bearing cage assembly which, effectively reduces the amount of friction between the guide post, guide sleeve, and the interposed ball bearings and lengthens life of original tooling specification.

These and other features and objects of the present invention will be seen in the following specification and claims in conjunction with the appended drawings, of which the following is a brief description.

DETAILED DESCRIPTION OF THE INVENTION

Figure 1:
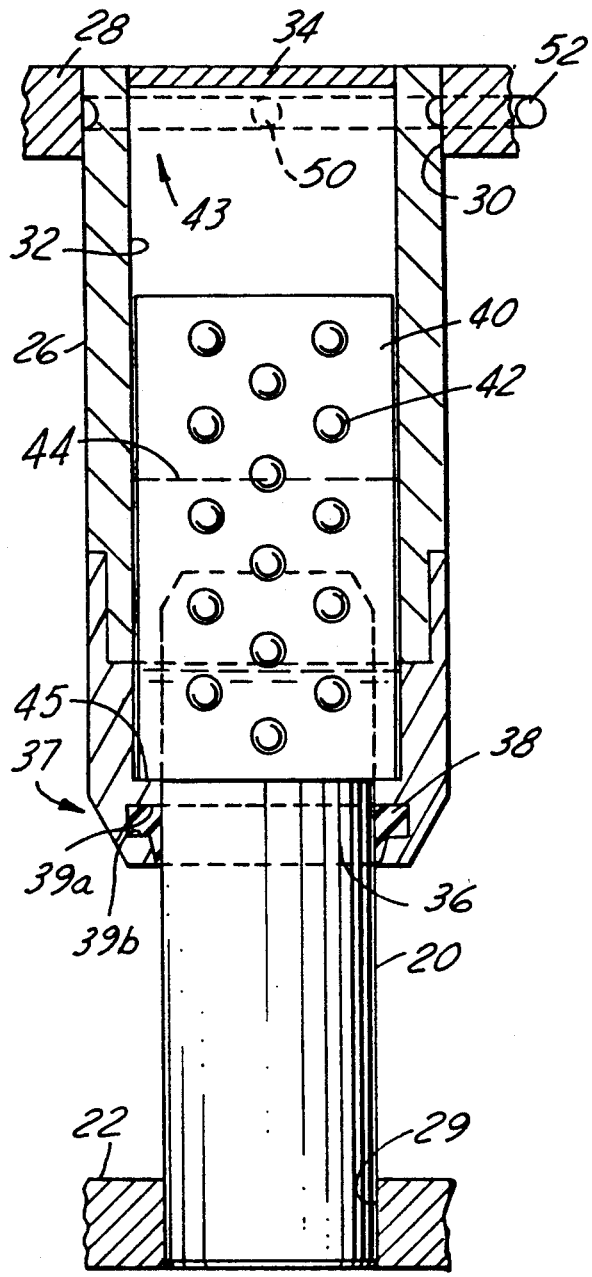
FIG. 1 is a partial cross sectional view of the inventive guide sleeve, guide post and ball bearing assembly interposed between upper and lower die shoes of a die set.

Referring to FIG. 1, there is shown a guide sleeve, guide post and ball bearing assembly incorporating the inventive guide sleeve sealing member. The guide post 20 is shown affixed to a lower die shoe 22 press fitted in an inner aperture 24 in the lower die shoe.

Guide sleeve 26 is shown affixed to an upper die shoe 28 within an aperture 30 and axially aligned such that it slidably receives guide post 20 during relative reciprocal movements between die shoes 22 and 28. Guide sleeve 26 has an internal coaxial bore 32 and a plug 34 maintained at the end of the guide sleeve affixed to the die shoe 28. At the opposite end of the guide sleeve, there is a sealing member 36 which slidably seals the interface between the free end 37 of guide sleeve 26 and guide post 20.

Sealing member 36 is fixedly maintained within the free end 37 of guide sleeve 26. Free end 37 preferably has a tapered, conical exterior that is narrowest near a terminal point on guide sleeve 26. The interior of free end 37 is preferably of a smaller radius than interior bore 32. The inner peripheral surface of free end 37 preferably has a nominal radius that is only slightly larger than the outside radius of guide post 20 such that guide sleeve 26 slidably receives guide post 20. Free end 37 preferably contains a notch 38 extending radially outward and having a radius that is slightly larger than the nominal radius of free end 37. Notch 38 preferably has a constant radius for a portion of its longitudinal length beginning at a reaction surface 39a defined at a most internal end of the notch and ending at a second reaction surface 39b. The radial length of the second, more external reaction surface 39b is approximately half the length of the most internal reaction surface 39a, which is equal to the radius of the notch at its most internal end minus the nominal radius of free end 37. Adjacent the second reaction surface, the radius of notch 38 begins to steadily decrease until a point adjacent a terminal point on guide sleeve 26 where the radius of notch 38 is approximately equal to the nominal radius of free end 37. Notch 38, therefore has a tapered conical portion that is widest at its most internal end and extends longitudinally outward from second reaction surface 39b to a point adjacent a terminal point on guide sleeve 26.

The shape of notch 38, therefore, defines a pair of axially opposing reaction surfaces 39a and 39b that bear against sealing member 36 such that sealing member 36 remains stationary relative to guide sleeve 26 during reciprocal movements between guide sleeve 26 and guide post 20. In this manner, free end 37 of guide sleeve 26 is shaped to securely contain a sealing means 36 such as a correspondingly shaped rubber coaxial ring.

The ball bearing cage 40 is of cylindrical form and is maintained within the central bore 32 of the guide sleeve and adjustably receives the guide post 20. Cage 40 is maintained in central bore 32 by known retention means, such as for example the retention means disclosed in U.S. Pat. No. 4,665,534 which is incorporated herein by reference. Ball bearing cage 40 maintains a plurality of ball bearings 42 in a series of longitudinally spaced circles of radially bored holes. The ball bearings 42 are circularly arranged and project inwardly and outwardly respectively, of the ball bearing cage 40 and are engageable with guide post 20 and with the internal coaxial bore 32 of guide sleeve 26.

A reservoir 43 for lubricating fluid 44 is maintained within internal bore 32 between the end 45 of the interior of the guide sleeve 26 and the plug 34 by seal 36. In the disclosed embodiment, oil is supplied to the interior of guide sleeve 26 through openings 50 in sleeve 26. Lube filler openings 52 are provided in the die shoe 28 and intersect the opening 50. Therefore, the ball bearing cage 40 is maintained within a generally enclosed environment containing lubricating fluid. Moreover, the inventive configuration allows for the lubricating fluid to be maintained where it is required most. In the illustrated embodiment, the ball bearing cage 40 engages the guide post 20 near the lower end of the guide sleeve. With the inventive guide sleeve seal configuration, it is possible to concentrate lubricating fluid at the lower end of the guide sleeve thereby lubricating the ball bearings at the point where they engage the guide post throughout its stroke which may reach 2500 strokes per minute. The inventive configuration facilitates cooler operation under such high speed conditions, and therefore, adds additional life to original tolerance specifications.

Although FIG. 1 illustrates guide sleeve 26 above guide post 20, the configuration could be reversed such that guide sleeve 26 is below guide post 20. In this latter configuration, sleeve 26 is preferably modified to include a cap to prevent lubrication loss or migration.

Figure 2:
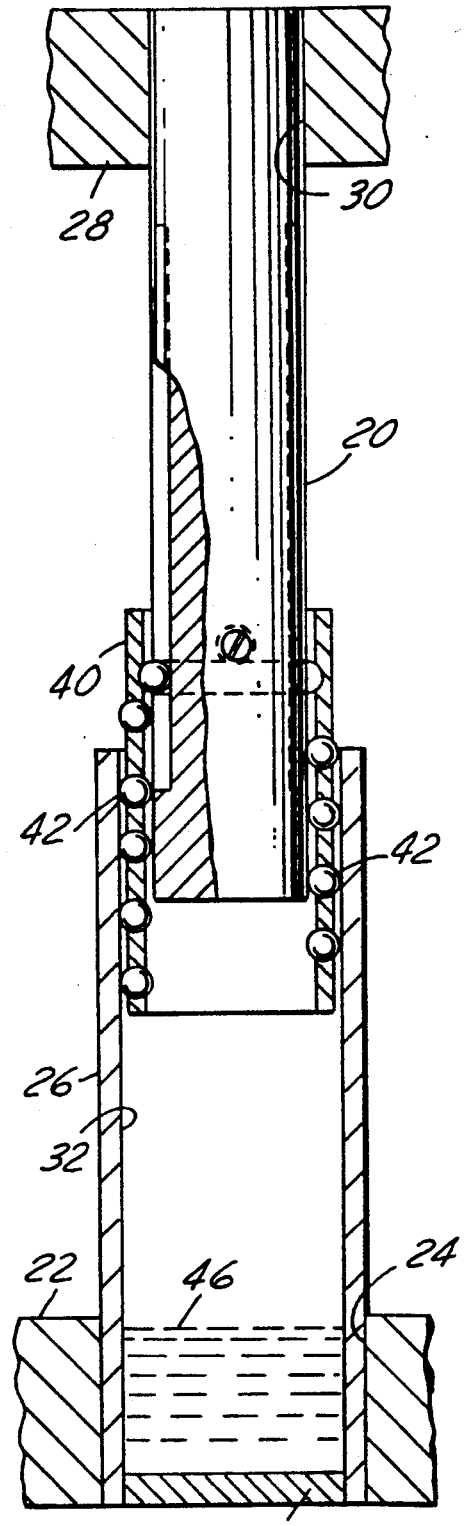
FIG. 2 is a partial cross sectional view of a prior art guide sleeve, guide post and ball bearing assembly showing an open ended guide sleeve.

FIG. 2, wherein like numerals refer to like parts of the guide post, guide sleeve assemblies, shows an example of the prior art wherein the oil reservoir 46 is maintained at a lowest end of the guide sleeve closest to the die shoe 22 and furthest from the point where the ball bearing cage assembly adjustably receives the guide post. Therefore, optimal lubrication of the ball bearings is not maintained without the inventive guide sleeve seal configuration.

Referring again now to FIG. 1, as guide post 20 and guide sleeve 26 move reciprocally, the sealing member 36 slidingly moves longitudinally along guide post 20 effectively performing a cleaning action along the edge of the guide post. Therefore, sealing member 36 prevents any dirt, dust or debris which may have collected on guide post 20 from entering into the lubricating fluid reservoir 43. As can be seen in FIG. 2, in the prior art, a gap exists between guide sleeve 26 and guide post 20 such that any debris or dirt collecting on guide post 20 could contaminate the lubricating fluid 48. Therefore, the inventive guide sleeve seal provides a more effective lubricating fluid reservoir, resulting in a better, more frictionless environment within a die set. In the prior art, any debris or dirt collecting on a ball bearing or guide post or within the lubricating fluid reservoir would increase the amount of friction during reciprocal movement of the guide post and guide sleeve with the interposed bill bearing cage assembly and could scar the post creating more wear on the system.

The inventive guide sleeve seal is adaptable for use with any guide sleeve, guide post and ball bearing assembly for a die set including those where the ball bearing assembly is not rotatably mounted and those where the ball bearing assembly is rotatably mounted, such as in U.S. Pat. No. 4,664,534, previously described.

It will be apparent to those skilled in the art that the foregoing disclosure is exemplary in nature rather than limiting, the invention being limited only by the appended claims.

I claim:

1. In combination, a guide post having a longitudinal axis;
   a cylindrical ball bearing cage having a coaxial longitudinal axis and a bore adjustably receiving said post, and adapted for movement thereon;
   said cage mounting a plurality of longitudinally spaced circularly arranged ball bearings projecting inwardly and outwardly thereof, engagable with said post and a guide sleeve respectively;
   a guide sleeve having a coaxial longitudinal axis and a bore adjustably receiving said post and containing said cage; and
   said guide sleeve having a leak resistant sealing means for slidably sealing the interface between said guide sleeve and said post, said sleeve having an end with an inner peripheral surface with a nominal radius that is small than the radius of said bore, but larger than the radius of said guide post and further contains a notch extending radially upward beyond said nominal radius, said notch defining two axially opposed reaction surfaces, a first reaction surface being more internal to said guide sleeve and a second reaction surface being disposed between said first reaction surface and a terminal point on said guide sleeve, said notch further comprising a tapered portion being narrowest at its most external end and having a radius that increases from a value approximately equal to said nominal radius adjacent to said terminal point on said guide sleeve to a value equal to said notch radius minus the radial length of said second reaction surface adjacent to said second reaction surface.

2. The combination of claim 1, wherein said sealing means sealingly maintains lubricating means within said guide sleeve for lubricating said ball bearings.

3. The combination of claim 2, wherein said lubricating means comprises a lubricating fluid.

4. The combination of claim 1, wherein said ball bearing cage is adapted for relative longitudinal and rotary movements within said guide sleeve and upon said guide post.

5. The combination of claim 1, further comprising said guide post and guide sleeve being at their ends projected into and secured within the opposing relatively movable dye shoes of a dye set assembly.

6. The combination of claim 5, wherein said guide sleeve is secured within either of said opposing die shoes such that said leak resistant sealing means is axially opposite said guide sleeve secured end.

7. The combination of claim 1, wherein said leak resistant sealing means comprises a rubber coaxial ring having a radial thickness and an internal radius sufficient to provide a leak resistant seal along the interface between said guide post and said guide sleeve, said sealing means being maintained near an end of said guide sleeve.

8. The combination of claim 1 wherein said sealing means comprises a rubber coaxial ring shaped such that said ring is disposed within said notch such that said reaction surfaces respectively bear against said sealing means such that said sealing means is maintained axially stationary relative to said guide sleeve during reciprocal movements between said guide sleeve and said guide post, said sealing means having a radial thickness and an internal radius sufficient to provide a leak resistant seal along the interface between said guide post and said guide sleeve.

9. The combination of claim 1, wherein said guide sleeve has an opening therein for supplying a lubricating means into said bore.

10. The combination of claim 9, wherein said guide sleeve is at one end projected into a die shoe of a die set assembly and wherein said dye shoe has a lubrication filler opening defined therein, adapted for fluid communication with said opening in said guide sleeve, for supplying the lubricating means into said bore.

11. In combination, a guide post having a longitudinal axis;
a cylindrical ball bearing cage having a coaxial longitudinal axis and a bore adjustably receiving said post, and adapted for movement thereon;
said cage mounting a plurality of longitudinally spaced circularly arranged ball bearings projecting inwardly and outwardly thereof, engagable with said post in a guide sleeve respectively;
a guide sleeve having a coaxial longitudinal axis and a bore adjustably receiving said post and containing said cage;
said guide sleeve having a leak resistant sealing and cleaning means for slidably sealing the interface between said guide sleeve and said post and for cleaning the surface of said post during relative reciprocal movements between said guide post and said guide sleeve;
said guide sleeve having an end with an inner peripheral surface with a nominal radius that is smaller than the radius of said bore, but larger than the radius of said guide post and further contains a notch extending radially outward beyond said nominal radius, said notch defining two axially opposed reaction surfaces, a first reaction surface being more internal to said guide sleeve and a second reaction surface being disposed between said first reaction surface and a terminal point on said guide sleeve, said notch further comprising a tapered portion being narrowest at its most external end and having a radius that increases from a value approximately equal to said nominal radius adjacent to said terminal point on said guide sleeve to a value equal to said notch radius minus the radial length of said second reaction surface adjacent to said second reaction surface.

12. The combination of claim 11, wherein said sealing and cleaning means comprises a rubber coaxial ring having a radial thickness and an internal radius sufficient to provide a leak resistant seal along the interface between said guide post and said guide sleeve, said internal radius being sufficient to clean the surface of said post during reciprocal movements between said post and said guide sleeve, said sealing means being maintained near an end of said guide sleeve.

13. The combination of claim 11 wherein said sealing and cleaning means comprises a rubber coaxial ring shaped such that said ring is disposed within said notch such that said reaction surfaces respectively bear against said sealing and cleaning means such that said sealing and cleaning means is maintained axially stationary relative to said guide sleeve during relative reciprocal movements between said guide sleeve and said guide post, said sealing and cleaning means having a radial thickness and an internal radius sufficient to provide a leak resistant seal along the interface between said guide post and said guide sleeve, said internal radius being sufficient to enable said sealing and cleaning means to slidingly clean the surface of said post during reciprocal movements between said post and said guide sleeve.

14. The combination of claim 11, wherein said ball bearing cage is adapted for relative longitudinal and rotary movements within said guide sleeve and upon said guide post.

15. The combination of claim 11, wherein said sealing and cleaning means sealingly maintains lubricating fluid within said guide sleeve for lubricating said ball bearings.

16. The combination of claim 11, further comprising said guide post and guide sleeve being at their ends projected into and secured within the opposing relatively moveable die shoes of a die set assembly and said sealing and cleaning means is axially opposite said guide sleeve secured end.

17. The combination of claim 16, wherein said guide sleeve has an opening therein for supplying a lubricating means into said bore.

18. The combination of claim 17, wherein said guide sleeve is at one end projected into a die shoe of a die set assembly and wherein said dye shoe has a lubrication filler opening defined therein, adapted for fluid communication with said opening in said guide sleeve, for supplying the lubricating means into said bore.

* * * * *